US012803227B2

(12) United States Patent
Takeuchi et al.

(10) Patent No.: US 12,803,227 B2
(45) Date of Patent: Nov. 17, 2026

(54) CONNECTOR WITH DIE-CAST OUTER CONDUCTOR AND CONTACTING MEMEBER

(71) Applicant: SUMITOMO WIRING SYSTEMS, LTD., Mie (JP)

(72) Inventors: Kazuya Takeuchi, Mie (JP); Hiroaki Tsutsumi, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 358 days.

(21) Appl. No.: 18/590,084

(22) Filed: Feb. 28, 2024

(65) Prior Publication Data

US 2024/0305046 A1 Sep. 12, 2024

(30) Foreign Application Priority Data

Mar. 10, 2023 (JP) ................................ 2023-037112

(51) Int. Cl.
*H01R 13/6581* (2011.01)
*H01R 13/6594* (2011.01)

(52) U.S. Cl.
CPC ..... *H01R 13/6581* (2013.01); *H01R 13/6594* (2013.01)

(58) Field of Classification Search
CPC ............ H01R 13/6581; H01R 13/6582; H01R 13/6583; H01R 13/6594; H01R 13/6597
See application file for complete search history.

(56) References Cited

U.S. PATENT DOCUMENTS

| | | | | |
|---|---|---|---|---|
| 5,975,957 | A | 11/1999 | Noda et al. | |
| 10,700,476 | B2 * | 6/2020 | Hosoyamada | H01R 13/6596 |
| 11,303,070 | B2 * | 4/2022 | Maesoba | H01R 13/502 |
| 12,401,152 | B2 * | 8/2025 | Isoda | H01R 13/514 |
| 2016/0315425 | A1 | 10/2016 | Nishimori et al. | |
| 2024/0305033 | A1 * | 9/2024 | Tsutsumi | H01R 13/5045 |

* cited by examiner

*Primary Examiner* — Renee S Luebke
*Assistant Examiner* — Paul D Baillargeon
(74) *Attorney, Agent, or Firm* — Venjuris, P.C.

(57) ABSTRACT

A connector includes an inner conductor, a die-cast outer conductor that surrounds the outer periphery of the inner conductor, a housing to which the die-cast outer conductor is fitted, and a contacting member that is to be in electric contact with an external grounding member and the die-cast outer conductor. The contacting member includes first elastic contacting portions capable of being elastically deformed that come into contact with the grounding member, a second elastic contacting portion capable of being elastically deformed that comes into contact with the die-cast outer conductor, and a coupling portion that couples the first elastic contacting portions and the second elastic contacting portion together and is attached to the outer surface of the housing. The housing includes grooves that are open in the outer surface of the housing, and the coupling portion includes protruding pieces that are placed in the grooves in a press-fitted state.

7 Claims, 6 Drawing Sheets

CONNECTOR WITH DIE-CAST OUTER CONDUCTOR AND CONTACTING MEMEBER

CROSS-REFERENCE TO RELATED APPLICATIONS

This application is based on and claims priority from Japanese Patent Application No. 2023-037112, filed on Mar. 10, 2023, with the Japan Patent Office, the disclosure of which is incorporated herein in its entirety by reference.

TECHNICAL FIELD

The present invention relates to a connector.

BACKGROUND

JP 2016-207411 A discloses a connector formed by covering a housing made of a synthetic resin with a shell made of a metal. The shell is formed using a metal sheet. The shell is provided with a shell-side grounding connection portion capable of coming into elastic contact with an external casing. The configurations disclosed in JP H10-289760 A and the like are also known as a configuration capable of coming into elastic contact with an external casing (grounding member).

SUMMARY

In a connector, in the case where communication is performed in a higher-frequency band, it is preferable that an outer conductor (shell) surrounds, without leaving any gaps, the periphery of an inner conductor. In order to achieve such an outer conductor, it is conceivable to produce the outer conductor through die-casting. If the outer conductor is produced through die-casting, it is difficult to provide the outer conductor itself with a portion that comes into elastic contact with the external casing. For this reason, a technology that reliably establishes electric continuity between the external casing and the external conductor is required.

Therefore, it is an object of the present disclosure to provide a connector capable of reliably establishing electric continuity between the die-cast outer conductor and the grounding member.

A connector of the present disclosure includes: an inner conductor; a die-cast outer conductor that surrounds an outer periphery of the inner conductor; a housing to which the die-cast outer conductor is fitted; and a contacting member that is to be in electric contact with an external grounding member and the die-cast outer conductor, wherein the contacting member includes: a first elastic contacting portion capable of being elastically deformed that comes into contact with the grounding member; a second elastic contacting portion capable of being elastically deformed that comes into contact with the die-cast outer conductor; and a coupling portion that couples the first elastic contacting portion and the second elastic contacting portion together and is attached to an outer surface of the housing, the housing includes a groove that is open in the outer surface of the housing, and the coupling portion includes a protruding piece that is placed in the groove in a press-fitted state.

With the present disclosure, it is possible to reliably establish electric continuity between the die-cast outer conductor and the grounding member.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
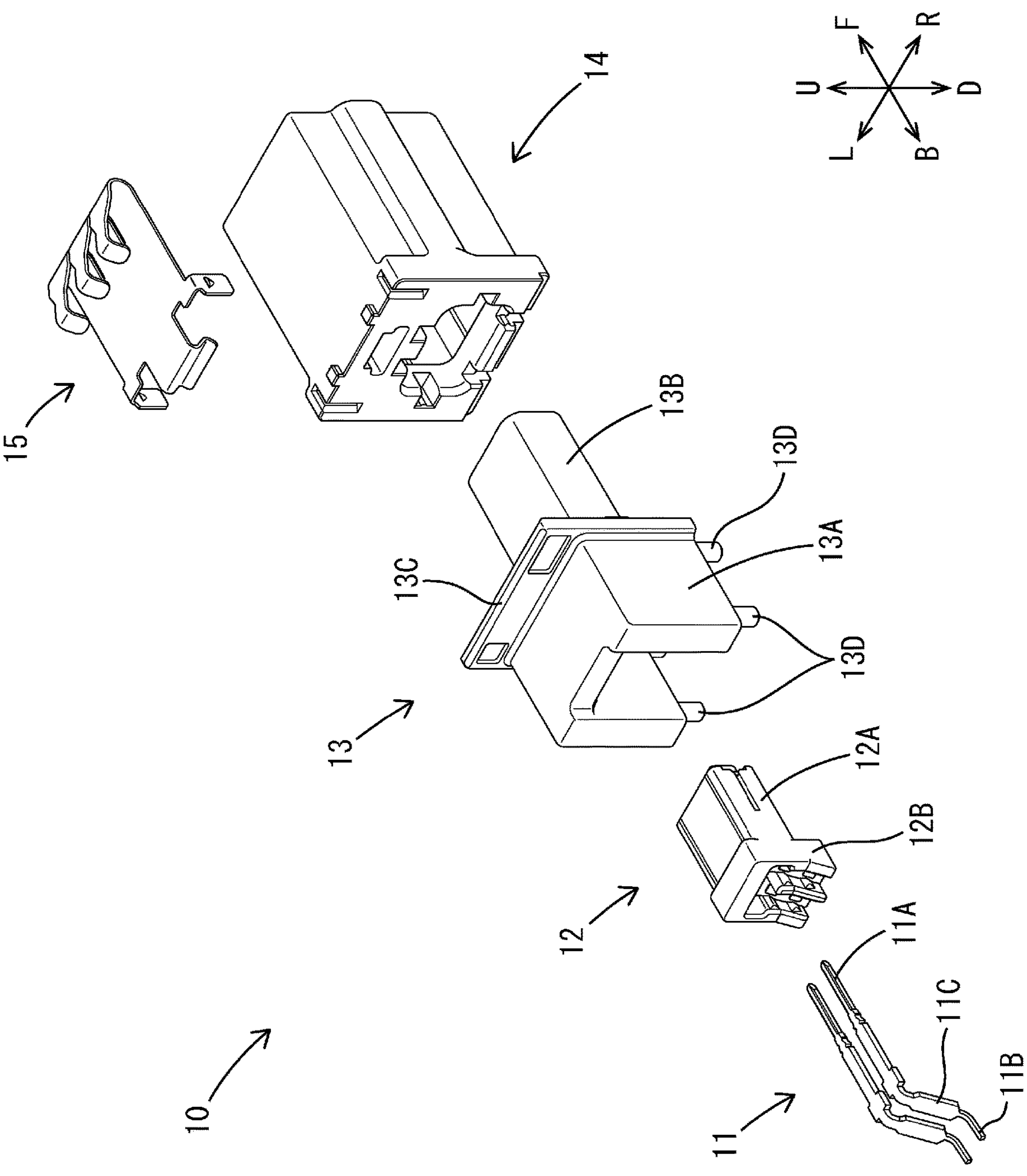
FIG. 1 is an exploded perspective view of a connector according to an embodiment of the present disclosure.

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

DESCRIPTION OF EMBODIMENTS OF THE PRESENT DISCLOSURE

First, aspects of the present disclosure will be listed and described.

(1) A connector of the present disclosure includes: an inner conductor; a die-cast outer conductor that surrounds an outer periphery of the inner conductor; a housing to which the die-cast outer conductor is fitted; and a contacting member that is to be in electric contact with an external grounding member and the die-cast outer conductor, wherein the contacting member includes: a first elastic contacting portion capable of being elastically deformed that comes into contact with the grounding member; a second elastic contacting portion capable of being elastically deformed that comes into contact with the die-cast outer conductor; and a coupling portion that couples the first elastic contacting portion and the second elastic contacting portion together and is attached to an outer surface of the housing, the housing includes grooves that are open in the outer surface of the housing, and the coupling portion includes protruding pieces that are placed in the grooves in a press-fitted state.

With this configuration, in addition to reliably attaching the coupling portion to the outer surface of the housing by placing the protruding pieces in the grooves in the press-fitted state, it is possible to bring the first elastic contacting portion and the second elastic contacting portion that are coupled to the coupling portion into elastic contact with the grounding member and the die-cast outer conductor, respectively. This makes it easy to stabilize the electric contact between the die-cast outer conductor and the grounding member.

(2) It is preferable that the coupling portion includes a plate-shaped coupling body extending in a width direction in parallel with the outer surface of the housing, the protruding pieces protrude from two ends in the width direction of the coupling body, and in the housing, the grooves are spaced apart in the width direction and corresponds to the protruding pieces.

With this configuration, the protruding pieces prevent the coupling portion from coming off the housing, thus making it possible to stably holding the coupling portion on the housing.

(3) It is preferable that, when a side on which a partner housing is to be fitted into the housing is taken as a front side, the die-cast outer conductor includes: an outer conductor body that is placed behind the housing and is lined up with the housing; and a plate-shaped flange portion that extends outward from the outer conductor body, the contacting member is placed across the flange portion and the housing in a front-back direction, and the second elastic contacting portion comes into contact with a back surface of the flange portion.

With this configuration, the second elastic contacting portion comes into elastic contact with the flange portion in the direction in which the die-cast outer conductor and the housing come close to each other, thus making it possible to restrict separation between the die-cast outer conductor and the housing.

(4) It is preferable that the housing includes a restricting portion that is opposed to the contacting member and is capable of coming into contact with the contacting member from a back side.

With this configuration, the restricting portion restricts the displacement of the contacting member toward the die-cast outer conductor, thus making it easy to maintain the contact pressure applied to the flange portion by the second elastic contacting portion.

(5) It is preferable that the restricting portion protrudes from the outer surface of the housing, and the contacting member includes a recess into which the restricting portion is capable of being fitted.

With this configuration, it is possible to restrict the movement of the contacting member from the housing in a backward direction as well as restrict the movement of the contacting member in the left-right direction intersecting the front-back direction.

(6) It is preferable that the grooves are open in a back surface of the housing, and the flange portion is placed to block the openings of the grooves in the back surface of the housing.

With this configuration, it is easy to simplify a mold structure for forming the grooves in the housing.

DETAILS OF EMBODIMENTS OF THE PRESENT DISCLOSURE

Embodiment 1

The following describes Embodiment 1 in which a connector of the present disclosure is embodied, with reference to FIGS. 1 to 6. In the diagrams, the "front side", the "back side", the "upside", the "downside", the "right side", and the "left side" are represented by "F", "B", "U", "D", "R", and "L", respectively. In Embodiment 1, the left-right direction corresponds to a width direction. A side on which a partner housing 30 is to be fitted into a housing 14 is taken as the front side. A connector 10 is a board connector to be mounted on a circuit board S (see FIG. 2). As shown in FIG. 1, the connector 10 includes an inner conductor 11, a dielectric 12, a die-cast outer conductor 13, a housing 14, and a contacting member 15.

<Configuration of Inner Conductor>

Figure 2:
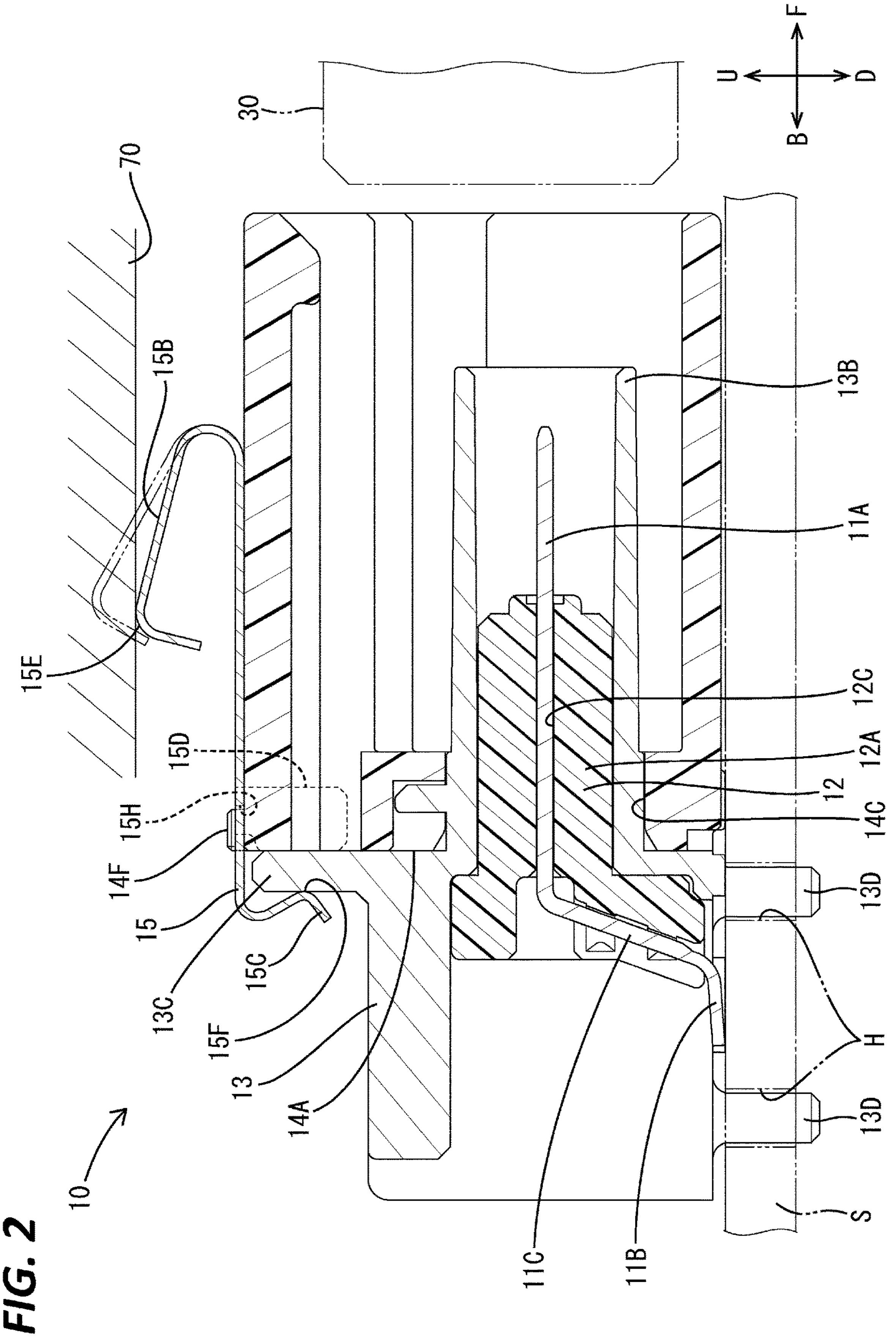
FIG. 2 shows a side cross-sectional view of the connector covered by a grounding member.

The inner conductor 11 is formed using a conductive metal plate material and has an elongated shape as a whole. The inner conductor 11 includes a partner connection portion 11A, a board connection portion 11B, and a linking portion 11C located between the partner connection portion 11A and the board connection portion 11B. The partner connection portion 11A extends in the front-back direction. As shown in FIG. 2, the back portion of the partner connection portion 11A is held by the dielectric 12 and the front portion of the partner connection portion 11A protrudes forward from the dielectric 12. The linking portion 11C and the board connection portion 11B are located on the back side of the dielectric 12 and are exposed. The linking portion 11C obliquely extends backward and downward from the back end of the partner connection portion 11A. The board connection portion 11B extends backward from the lower end of the linking portion 11C and is to be soldered to the conductive portion of the circuit board S.

<Configuration of Dielectric>

The dielectric 12 is made of an insulating synthetic resin material and has a block shape as a whole as shown in FIG. 1. The dielectric 12 has an L-shape in a side view. The dielectric 12 includes a terminal attachment portion 12A extending in the front-back direction, and a terminal extraction portion 12B that is continuous with the back end of the terminal attachment portion 12A and extends in a vertical direction. The terminal attachment portion 12A includes a pair of left and right attachment holes 12C (see FIG. 2). The attachment holes 12C pass through the terminal attachment portion 12A in the front-back direction. The partner connection portion 11A is inserted into the attachment hole 12C from the back side. The back portion of the partner connection portion 11A is held in the state of being press-fitted in the attachment hole 12C.

<Configuration of Die-Cast Outer Conductor>

The die-cast outer conductor 13 is, for example, a cast body formed through zinc die-casting or the like. The dielectric 12 into which the inner conductor 11 is fitted is placed inside the die-cast outer conductor 13 (see FIG. 2). The die-cast outer conductor 13 serves as a shielding member for suppressing the entrance of noise from the outside into the inner conductor 11 as well as suppressing the leakage of noise from the inner conductor 11 to the outside. A hood portion 13B of the die-cast outer conductor 13, which will be described later, surrounds, without any seams and gaps, the outer periphery of the partner connection portion 11A of the inner conductor 11, thus making it possible to ensure favorable shielding ability.

The die-cast outer conductor 13 includes an outer conductor body 13A, a hood portion 13B extending forward from the outer conductor body 13A, and the plate-shaped flange portion 13C extending outward from the outer conductor body 13A in a flange shape. The outer conductor body 13A has a gate shape in a back view. The front end of the outer conductor body 13A is continuous with the back surface of the flange portion 13C.

The outer conductor body 13A has the shielding ability as well as a function of preventing interference of foreign matter from the outside with the board connection portion 11B of the inner conductor 11. Also, the function of preventing the interference of foreign matter with the board connection portion 11B may be enhanced by attaching, to the outer conductor body 13A, a blocking member (not illustrated) for blocking the back end of the outer conductor body 13A. The outer conductor body 13A includes a plurality of installation protrusions 13D extending downward from the lower ends of the left and right side walls. Each of the installation protrusions 13D has a cylindrical shape and is to be inserted into an installation hole H formed in the circuit board S (see FIG. 2).

The hood portion 13B has a rectangular tubular shape with four rounded corners. As shown in FIG. 2, the terminal attachment portion 12A of the dielectric 12 can be fitted into the inner back portion of the hood portion 13B. The front portion of the partner connection portion 11A of the inner conductor 11 is placed inside the hood portion 13B so as to protrude forward.

Figure 3:
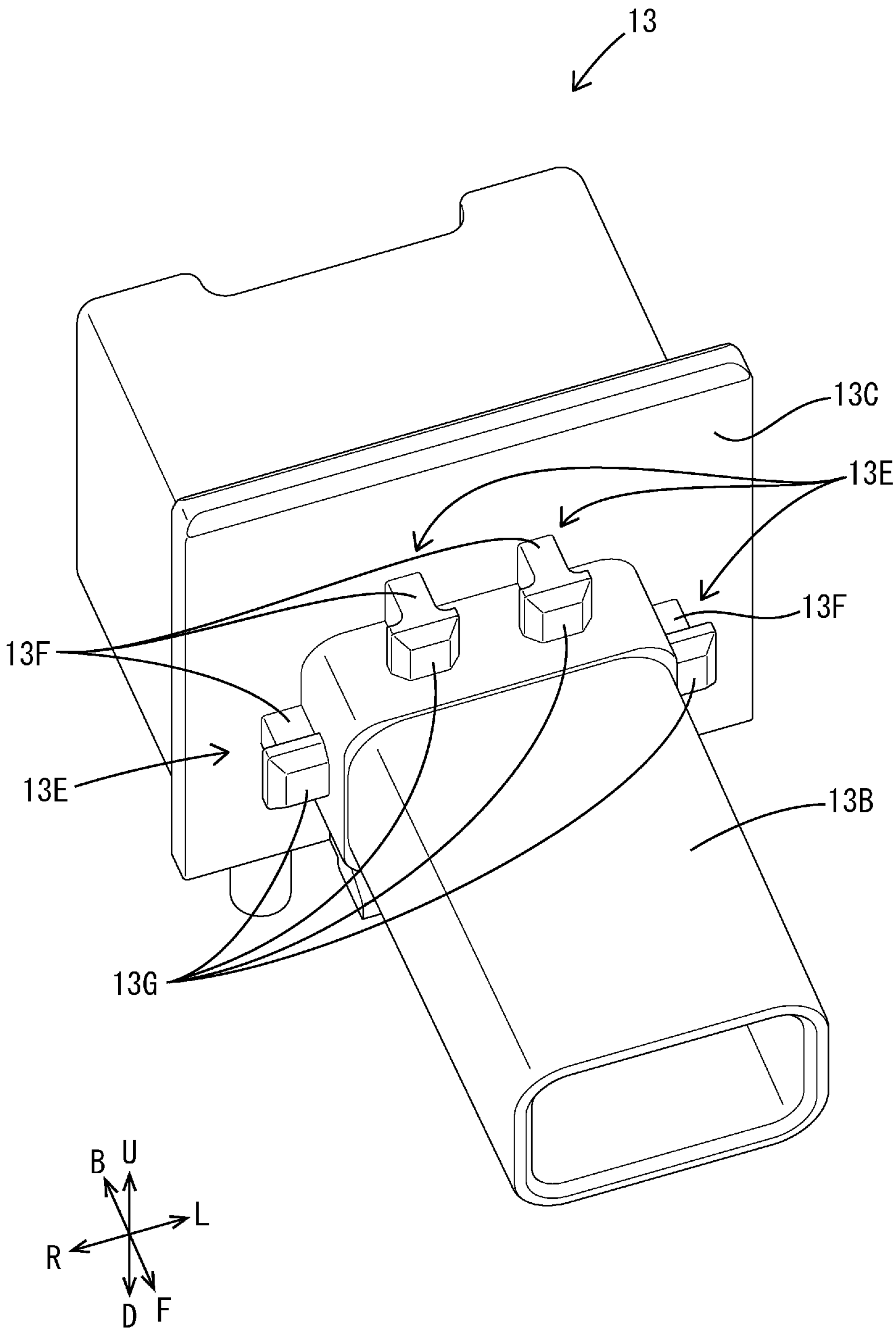
FIG. 3 is a perspective view showing a die-cast outer conductor.

As shown in FIG. 3, the flange portion 13C has a flat plate shape and protrudes radially outward from the base end of the hood portion 13B. The die-cast outer conductor 13 includes a plurality of locking protrusions 13E that protrude forward from the front surface of the flange portion 13C. Each of the locking protrusions 13E is also coupled to the outer peripheral surface of the hood portion 13B, in the front-back direction. The locking protrusions 13E are inserted into and locked to locking recesses 14D of the housing 14, which will be described later. Each of the locking protrusions 13E includes a protruding body 13F having a rectangular block shape, and a press-fitting protrusion 13G projecting from the front end of the protruding body 13F in a direction intersecting the front-back direction.

<Configuration of Housing>

Figure 4:
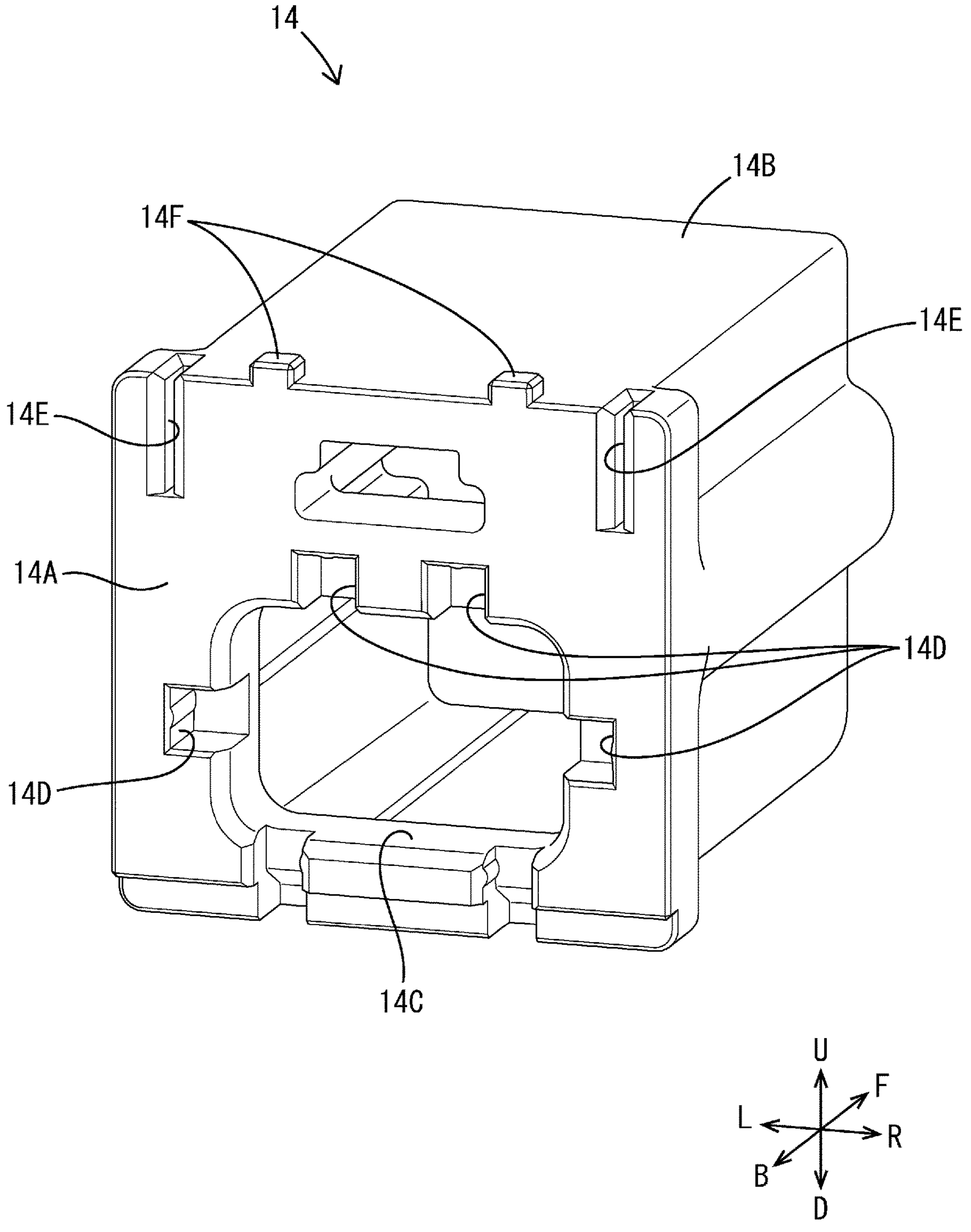
FIG. 4 is a perspective view showing a housing.

The housing 14 is made of an insulating synthetic resin material. As shown in FIG. 4, the housing 14 includes a base wall 14A having a flat plate shape with a rectangular shape in a back view, and a fitting tube portion 14B that has a rectangular tube shape and protrudes forward from the base wall 14A. The partner housing 30 is to be fitted into the fitting tube portion 14B (see FIG. 2).

The base wall 14A is provided with a through hole 14C passing therethrough. The hood portion 13B of the die-cast outer conductor 13 is inserted into the through hole 14C (see FIG. 2). The base wall 14A is provided with a plurality of locking recesses 14D. Each of the locking recesses 14D has a rectangular cross section and is recessed forward from the back surface of the base wall 14A, and the front end thereof is blocked inside the base wall 14A. The inner end of each locking recess 14D that faces inward in a radial direction is open so as to be communication with the through hole 14C.

The upper end of the base wall 14A is provided with a pair of grooves 14E. Specifically, one of the grooves 14E is formed at one end of the base wall 14A in the left-right direction, and the other groove 14E is formed at the other end of the base wall 14A. The pair of grooves 14E are spaced apart in the left-right direction. These grooves 14E correspond to protruding pieces 15D, which will be described later. Each of the grooves 14E is recessed forward from the back surface of the base wall 14A, and the front end thereof is blocked inside the base wall 14A. The upper ends of the grooves 14E are open upward. In other words, the grooves 14E are open in the outer surface (top surface) of the housing 14. Also, the grooves 14E are open in the back surface of the housing 14. The upper end of the base wall 14A is provided with a pair of restricting portions 14F that protrude upward and have a prism shape. In other words, these restricting portions 14F protrude from the outer surface (top surface) of the housing 14. These restricting portions 14F are spaced apart in the left-right direction. These restricting portions 14F are located between the pair of grooves 14E in the left-right direction.

<Configuration of Contacting Member>

Figure 5:
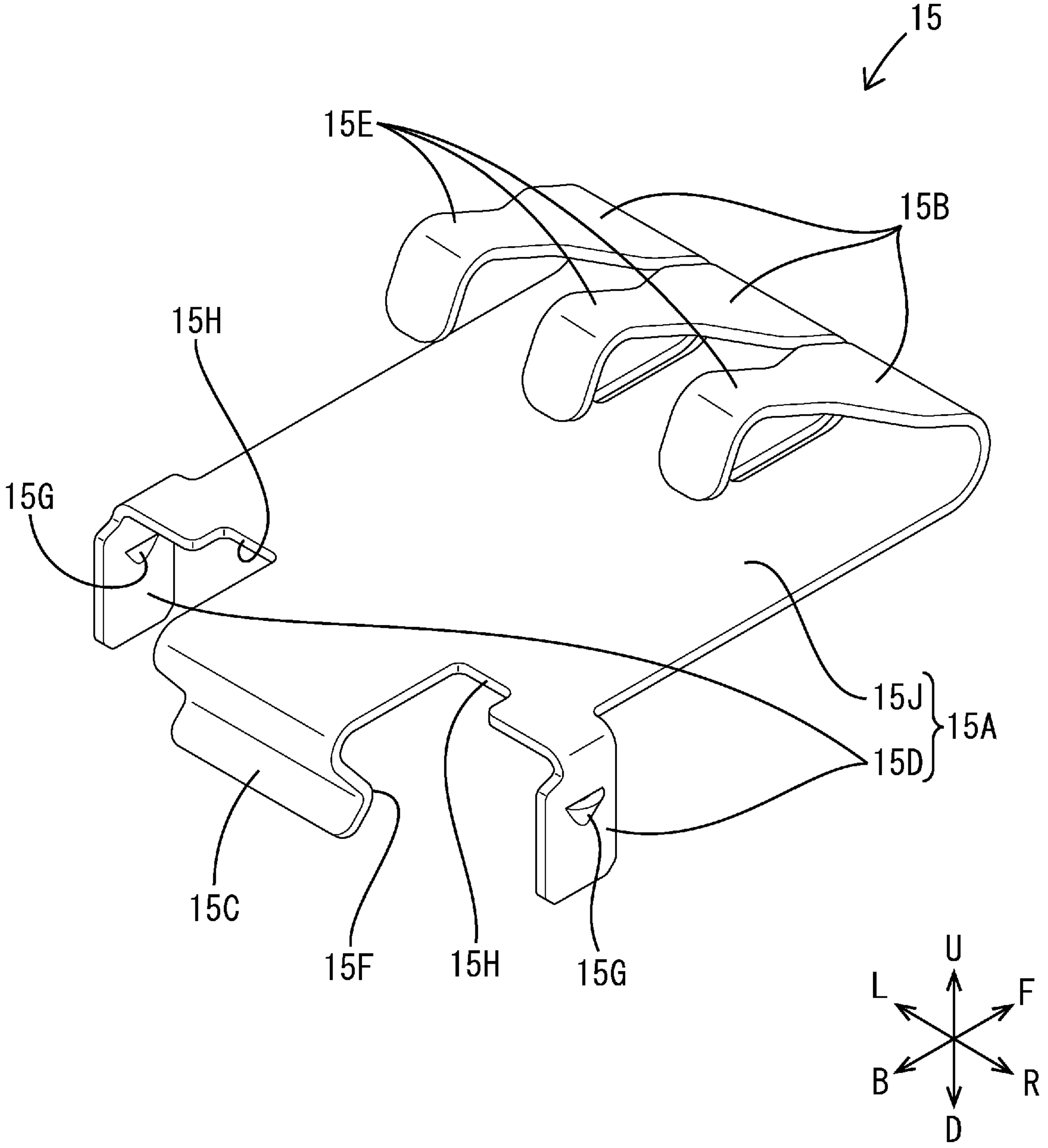
FIG. 5 is a perspective view showing a connection member.

The contacting member 15 is formed in one piece by, for example, bending a metal plate. As shown in FIG. 5, the contacting member 15 includes a coupling portion 15A to be attached to the outer surface (top surface) of the housing 14, first elastic contacting portions 15B that are coupled to the front end of the coupling portion 15A, and a second elastic contacting portion 15C that is coupled to the back end of the coupling portion 15A. The coupling portion 15A includes a coupling body 15J and a pair of protruding pieces 15D. The coupling body 15J has a flat plate shape that extends in the width direction in parallel with the top surface (outer surface) of the housing 14 (see FIG. 2).

One of the pair of protruding pieces 15D protrudes downward from the back end at one end of the coupling body 15J in the width direction (left-right direction), and the other protruding piece 15D protrudes downward from the back end at the other end of the coupling body 15J in the width direction. The thickness directions of these protruding pieces 15D extend in the left-right direction. The protruding pieces 15D have a rectangular shape in a side view (see FIG. 2). The back end portions of the protruding pieces 15D protrude backward. The lower ends of the protruding pieces 15D are located below the lower end of the second elastic contacting portion 15C (see FIG. 2).

Each of the protruding pieces 15D is provided with one locking portion 15G. The locking portion 15G protrudes outward in the left-right direction from a surface on the outside of the protruding piece 15D in the left-right direction. The shape of the locking portion 15G is such that the outward protrusion amount in the left-right direction increases from the lower end toward the upper end, and the upper end is steeply inclined inwardly in the left-right direction.

Figure 6:
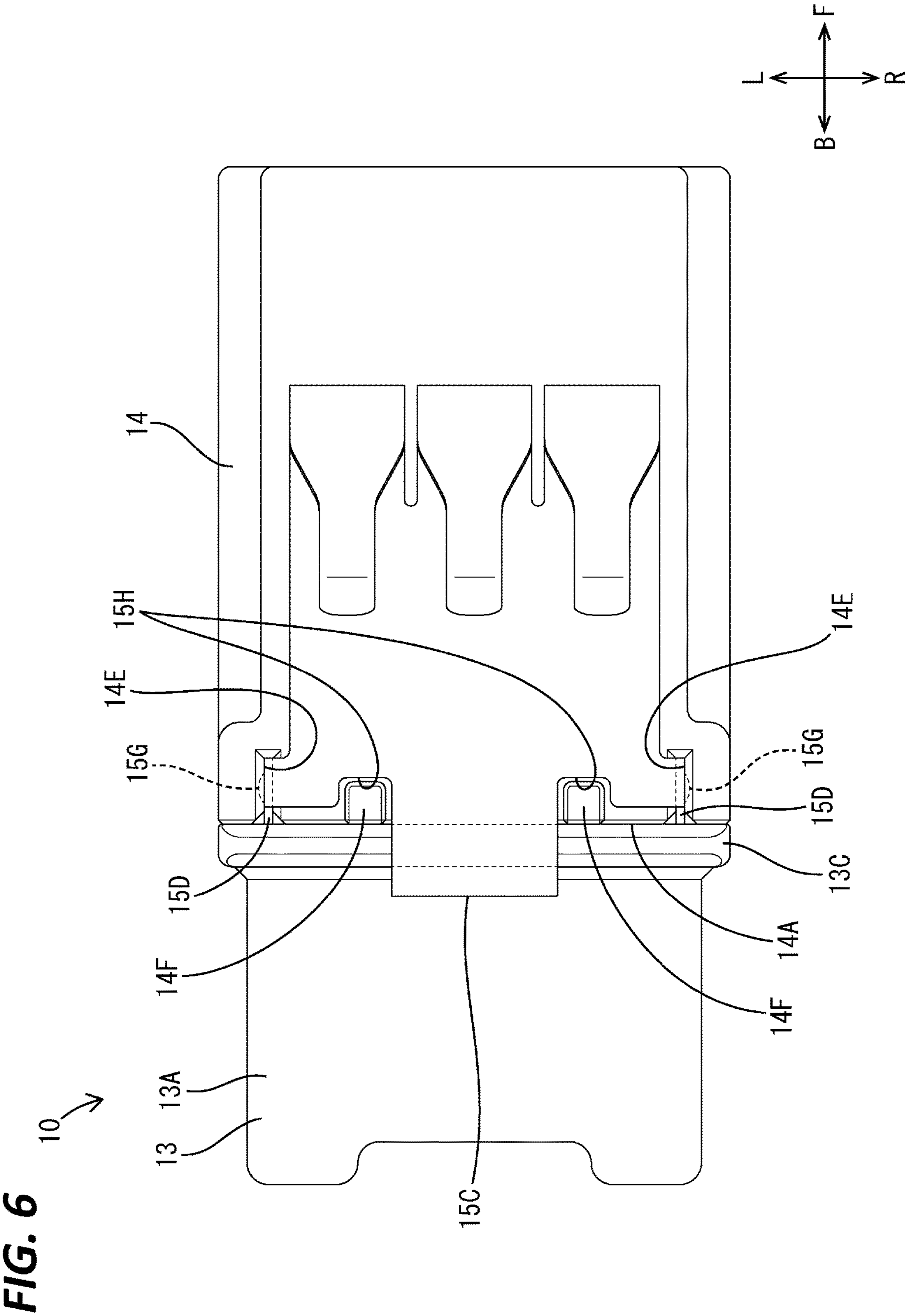
FIG. 6 is a plan view showing the connector.

When each of the protruding pieces 15D is inserted into the groove 14E of the housing 14 from above, the locking portion 15G bites into the wall surface of the groove 14E that faces inward in the left-right direction (see FIG. 6). As a result, the protruding pieces 15D are placed inside the grooves 14E in a press-fitted state, and the dislodgment from the grooves 14E is suppressed.

A plurality of (three in Embodiment 1) first elastic contacting portions 15B are lined up in the left-right direction at the front end of the coupling portion 15A. The first elastic contacting portions 15B have the same shape. Each of the first elastic contacting portions 15B extends forward from the front end of the coupling body 15J, and is bent and folded back to point backward and upward. Each of the first elastic contacting portions 15B is capable of being elastically deformed in the vertical direction using a folded-back portion with a curved shape formed at the front end of the coupling body 15J as a support.

In each of the first elastic contacting portions 15B, a top portion 15E that is convex upward is formed by bending downward the leading end in the extension direction. The grounding member 70, which is a conductive casing, is attached to the circuit board S to which the connector 10 is attached, so as to cover the connector 10 (see FIG. 2). Then, the top portions 15E of the first elastic contacting portions 15B are pressed downward by the inner surface of the grounding member 70 and are elastically deformed, and thus the state in which the first elastic contacting portions 15B are in elastic contact with the inner surface of the grounding member 70 is maintained (see FIG. 2). As a result, the contacting member 15 is electrically connected to the grounding member 70.

The second elastic contacting portion 15C hangs from the back end of the coupling body 15J with the plate surfaces facing in the front-back direction. The coupling body 15J of the coupling portion 15A couples the first elastic contacting portions 15B and the second elastic contacting portion 15C together. The second elastic contacting portion 15C has an S-shape in a side view (see FIG. 2). The upper portion of the second elastic contacting portion 15C is inclined downward and forward. The lower portion of the second elastic contacting portion 15C is inclined downward and backward. A portion that couples the upper portion and the lower portion of the second elastic contacting portion 15C is formed as a contact point portion 15F that is curved to protrude forward. The second elastic contacting portions 15C is capable of being elastically deformed in the front-back direction using a portion coupled to the coupling body 15J as a support.

One recess 15H that is recessed forward is formed between the second elastic contacting portion 15C and each of the pair of protruding pieces 15D. When the contacting member 15 is attached to the housing 14, the restricting portions 14F of the housing 14 are fitted into these recesses 15H with a gap between the restricting portion 14F and the recess 15H (i.e., in a loosely-fitted state) (see FIG. 6). In other words, at this time, the restricting portions 14F are opposed to the recesses 15H of the contacting member 15 and are capable of coming into contact with the recesses 15H from the back side (see FIG. 6). This prevents the contacting member 15 from being shifted to the back side when attached to the housing 14.

<Connector Assembly Procedure>

First, the hood portion 13B of the die-cast outer conductor 13 is inserted into the through hole 14C of the housing 14 from the back side. At the final stage of the insertion process, the locking protrusions 13E are inserted into the locking recesses 14D from the back side. When the front surface of the flange portion 13C of the die-cast outer conductor 13 is opposed to and abuts against the back surface of the base wall 14A, the operation of attaching the die-cast outer conductor 13 is stopped (see FIG. 6). Thus, the flange portion 13C is placed so as to block the openings of the pair of grooves 14E in the back surface of the housing 14. The outer conductor body 13A is placed behind the housing 14 and is lined up with the housing 14 (see FIG. 6).

When the locking protrusions 13E are properly inserted into the locking recesses 14D, each of the press-fitting protrusions 13G comes into contact, in the press-fitted state, with the opposed surface of the locking recess 14D that is opposed to the press-fitting protrusion 13G in the circumferential direction. Thus, the locking protrusions 13E are locked to the locking recesses 14D, and the die-cast outer conductor 13 is held in a state in which dislodgment from the housing 14 is prevented.

Next, the dielectric 12 into which the inner conductor 11 is press-fitted is attached to the die-cast outer conductor 13. Specifically, in a state in which the terminal attachment portion 12A faces forward and the board connection portion 11B of the inner conductor 11 is located at the lower end, the terminal attachment portion 12A is press-fitted into the hood portion 13B of the die-cast outer conductor 13 (see FIG. 2).

Next, the contacting member 15 is attached to the housing 14. Specifically, the contacting member 15 is brought into an orientation where the first elastic contacting portions 15B are located on the front side, the second elastic contacting portion 15C is located on the back side, and the pair of protruding pieces 15D protrude downward. Then, the pair of protruding pieces 15D are press-fitted into the pair of grooves 14E in of the housing 14 from above. When the lower end of each protruding piece 15D is press-fitted into the groove 14E, the contact point portion 15F of the second elastic contacting portion 15C comes into contact with the back surface of the flange 13C. Thus, the contacting member 15 is placed across the flange portion 13C and the housing 14 in the front-back direction (see FIG. 2). Then, when the coupling portion 15A comes into contact with the top surface of the housing 14, the attachment of the contacting member 15 to the housing 14 is completed (see FIG. 2).

At this time, as shown in FIG. 6, the pair of restricting portions 14F is opposed to and fitted into the pair of recesses 15H from the back side. The second elastic contact section 15C is placed on a side opposite to the housing 14 over the flange portion 13C. Then, the second elastic contacting portion 15C applies elastic force toward the front side (housing 14 side) to the flange portion 13C via the contact point portion 15F (see FIG. 2). In this manner, the assembly of the connector 10 is completed.

In an example of use of the connector 10, the connector 10 is attached to the circuit board S. Then, the circuit board S to which the connector 10 is attached is attached to the grounding member 70. As a result, the top portions 15E of the first elastic contacting portions 15B are pressed downward by the inner surface of the grounding member 70, and the state in which the first elastic contacting portions 15B are elastically deformed is maintained (see FIG. 2). In this manner, electric continuity between the die-cast outer conductor 13 and the grounding member 70 is established via the contacting member 15.

Next, the effects of this configuration are shown as examples.

The connector 10 includes: the inner conductor 11; the die-cast outer conductor 13 that surrounds the outer periphery of the inner conductor 11; the housing 14 to which the die-cast outer conductor 13 is fitted; and the contacting member 15 that is to be in electric contact with the external grounding member 70 and the die-cast outer conductor 13. The contacting member 15 includes: the first elastic contacting portions 15B capable of being elastically deformed that come into contact with the grounding member 70; the second elastic contacting portion 15C capable of being elastically deformed that comes into contact with the die-cast outer conductor 13; and the coupling portion 15A that couples the first elastic contacting portions 15B and the second elastic contacting portion 15C together and is attached to the outer surface of the housing 14. The housing 14 includes the grooves 14E that are open in the outer surface of the housing 14, and the coupling portion 15A includes the protruding pieces 15D that are placed in the grooves 14E in a press-fitted state. With this configuration, in addition to reliably attaching the coupling portion 15A to the outer surface of the housing 14 by placing the protruding pieces 15D in the grooves 14E in the press-fitted state, it is possible to bring the first elastic contacting portions 15B and the second elastic contacting portion 15C that are coupled to the coupling portion 15A into elastic contact with the grounding member 70 and the die-cast outer conductor 13, respectively. This makes it easy to stabilize the electric contact between the die-cast outer conductor 13 and the grounding member 70.

The coupling portion 15A includes a plate-shaped coupling body 15J extending in the width direction (left-right direction) in parallel with the outer surface of the housing 14, and the protruding pieces 15D protrude from two ends in the width direction (left-right direction) of the coupling body 15J. In the housing 14, the grooves 14E are spaced apart in the width direction (left-right direction) and corresponds to the protruding pieces 15D. With this configuration, the protruding pieces 15D prevent the coupling portion 15A from coming off the housing 14, thus making it possible to stably holding the coupling portion 15A on the housing 14.

When a side on which the partner housing 30 is to be fitted into the housing 14 is taken as a front side, the die-cast outer conductor 13 includes: the outer conductor body 13A that is placed behind the housing 14 and is lined up with the housing 14; and the plate-shaped flange portion 13C that extends outward from the outer conductor body 13A. The contacting member 15 is placed across the flange portion 13C and the housing 14 in the front-back direction. The second elastic contacting portion 15C comes into contact with the back surface of the flange portion 13C. With this configuration, the second elastic contacting portion 15C comes into elastic contact with the flange portion 13C in the direction in which the die-cast outer conductor 13 and the housing 14 come close to each other, thus making it possible to restrict separation between the die-cast outer conductor 13 and the housing 14.

The housing 14 further includes the restricting portions 14F that are opposed to the contacting member 15 and are capable of coming into contact with the contacting member 15 from the back side. With this configuration, the displacement of the contacting member 15 toward the die-cast outer conductor 13 is restricted, thus making it easy to maintain the contact pressure applied to the flange portion 13C by the second elastic contacting portion 15C.

The restricting portions 14F protrude from the outer surface of the housing 14, and the contacting member 15 includes the recesses 15H into which the restricting portions 14F are capable of being fitted. With this configuration, it is possible to restrict the movement of the contacting member 15 from the housing 14 in the backward direction as well as restrict the movement of the contacting member 15 in the left-right direction intersecting the front-back direction.

The grooves 14E are open in the back surface of the housing 14, and the flange portion 13C is placed to block the openings of the grooves 14E in the back surface of the housing 14. With this configuration, it is easy to simplify a mold structure for forming the grooves 14E in the housing 14.

Other Embodiments

The embodiments disclosed herein are exemplary in all respects, and should be construed as being not limitative. The scope of the present invention is not limited to the embodiments disclosed herein and is defined by the scope of the appended claims, and all changes that fall within the same essential spirit as the scope of the claims are intended to be included therein.

Unlike Embodiment 1, the coupling portion may be provided with holes through which the restricting portions are inserted.

Unlike Embodiment 1, locking portions that protrude inward in the left-right direction may be provided on surfaces of the protruding pieces that face inward in the left-right direction.

Unlike Embodiment 1, the die-cast outer conductor may also be made of a material such as an aluminum alloy through die-casting.

Unlike Embodiment 1, the flange portion may protrude only upward.

Unlike Embodiment 1, a configuration may also be employed in which the board connection portion of the inner conductor is inserted through a through hole that passes through the circuit board. In addition, a configuration may also be employed in which the die-cast outer conductor includes a plurality of hood portions, and dielectrics in which the inner conductor is press-fitted are press-fitted into and attached to the hood portions.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A connector comprising:

an inner conductor;

a die-cast outer conductor that surrounds an outer periphery of the inner conductor;

a housing to which the die-cast outer conductor is fitted; and a contacting member that is to be in electric contact with an external grounding member and the die-cast outer conductor, wherein the contacting member includes:

a first elastic contacting portion capable of being elastically deformed that comes into contact with the grounding member;

a second elastic contacting portion capable of being elastically deformed that comes into contact with the die-cast outer conductor; and a coupling portion that couples the first elastic contacting portion and the second elastic contacting portion together and is attached to an outer surface of the housing, the housing includes grooves that are open upward in the outer surface of the housing, and the coupling portion includes protruding pieces that are placed in the grooves in a press-fitted state, wherein the protruding pieces protrude from the coupling portion in a direction perpendicular to the outer surface of the housing and are inserted into the grooves from above.

2. The connector according to claim 1, wherein the coupling portion includes a plate-shaped coupling body extending in a width direction in parallel with the outer surface of the housing, the protruding pieces protrude from two ends in the width direction of the coupling body, and in the housing, the grooves are spaced apart in the width direction and correspond to the protruding pieces.

3. The connector according to claim 1, wherein each of the protruding pieces includes a locking portion that protrudes outward in a width direction from an outer surface of the protruding piece in the width direction.

4. A connector comprising:

an inner conductor;

a die-cast outer conductor that surrounds an outer periphery of the inner conductor;

a housing to which the die-cast outer conductor is fitted; and a contacting member that is to be in electric contact with an external grounding member and the die-cast outer conductor, wherein the contacting member includes:

a first elastic contacting portion capable of being elastically deformed that comes into contact with the grounding member;

a second elastic contacting portion capable of being elastically deformed that comes into contact with the die-cast outer conductor; and a coupling portion that couples the first elastic contacting portion and the second elastic contacting portion together and is attached to an outer surface of the housing, the housing includes grooves that are open in the outer surface of the housing, and the coupling portion includes protruding pieces that are placed in the grooves in a press-fitted state, wherein, when a side on which a partner housing is to be fitted into the housing is taken as a front side, the die-cast outer conductor includes:

an outer conductor body that is placed behind the housing and is lined up with the housing; and a plate-shaped flange portion that extends outward from the outer conductor body, the contacting member is placed across the flange portion and the housing in a front-back direction, and the second elastic contacting portion comes into contact with a back surface of the flange portion.

5. The connector according to claim 4, wherein the housing includes a restricting portion that is opposed to the contacting member and is capable of coming into contact with the contacting member from a back side.

6. The connector according to claim 5, wherein the restricting portion protrudes from the outer surface of the housing, and the contacting member includes a recess into which the restricting portion is capable of being fitted.

7. The connector according to claim 4, wherein the grooves are open in a back surface of the housing, and the flange portion is placed to block openings of the grooves in the back surface of the housing.

* * * * *